(12) United States Patent
Wang et al.

(10) Patent No.: US 8,337,596 B2
(45) Date of Patent: Dec. 25, 2012

(54) POLYALKYLENEACRYLAMIDE SALT FOR ACID GAS SCRUBBING PROCESS

(75) Inventors: Frank Cheng-Yu Wang, Annandale, NJ (US); Michael Siskin, Westfield, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 599 days.

(21) Appl. No.: 11/989,151

(22) PCT Filed: Aug. 1, 2006

(86) PCT No.: PCT/US2006/029895
§ 371 (c)(1),
(2), (4) Date: Mar. 19, 2009

(87) PCT Pub. No.: WO2007/021532
PCT Pub. Date: Feb. 22, 2007

(65) Prior Publication Data
US 2009/0217817 A1   Sep. 3, 2009

(51) Int. Cl.
*B01D 53/02* (2006.01)
(52) U.S. Cl. .............................. 95/235; 95/236; 423/228
(58) Field of Classification Search ............ 95/235–236; 423/228–229
See application file for complete search history.

(56) References Cited

U.S. PATENT DOCUMENTS

| | | |
|---|---|---|
| 2,143,393 A | 1/1939 | Heinrich et al. |
| 4,112,050 A | 9/1978 | Sartori et al. |
| 4,112,051 A | 9/1978 | Sartori et al. |
| 4,112,052 A | 9/1978 | Sartori et al. |
| 4,405,581 A | 9/1983 | Savage et al. |
| 4,405,583 A | 9/1983 | Stogryn et al. |
| 4,405,585 A | 9/1983 | Sartori et al. |
| 4,417,075 A | 11/1983 | Stogryn |
| 4,471,138 A | 9/1984 | Stogryn |
| 4,487,967 A | 12/1984 | Stogryn et al. |
| 4,525,294 A | 6/1985 | Sartori et al. |
| 4,665,195 A | 5/1987 | Stogryn et al. |
| 4,859,437 A | 8/1989 | Grinstead |
| 4,892,719 A * | 1/1990 | Gesser ..................... 423/245.1 |
| 4,894,178 A | 1/1990 | Ho et al. |
| 4,941,991 A | 7/1990 | Rajamannan |
| 4,960,575 A | 10/1990 | Bedell et al. |
| 5,350,788 A * | 9/1994 | Visioli et al. ................. 524/251 |
| 5,376,614 A | 12/1994 | Birbara et al. |
| 5,583,273 A | 12/1996 | Colle et al. |
| 6,099,621 A | 8/2000 | Ho |
| 6,557,881 B2 | 5/2003 | Kortesalmi |

FOREIGN PATENT DOCUMENTS

CA          1173671 A       9/1984
(Continued)

OTHER PUBLICATIONS http://www4.ncsu.edu/~hubbe/PEI.htm.*
(Continued)

*Primary Examiner* — Duane Smith
*Assistant Examiner* — Ives Wu
(74) *Attorney, Agent, or Firm* — Malcolm D. Keen; Glenn T. Barrett

(57) ABSTRACT

Hydrocarbyl substituted and unsubstituted polyethylene imines and polyacrylamide salts are absorption compositions and are useful in processes for the treatment of acid gas mixtures.

3 Claims, 1 Drawing Sheet

Adsorption-Regeneration Unit for Selective H$_2$S Removal

FOREIGN PATENT DOCUMENTS

| | | |
|---|---|---|
| FR | 2497670 A | 7/1982 |
| GB | 2017524 | 10/1979 |
| JP | 62216641 A | 9/1987 |
| WO | 9904885 A1 | 2/1999 |
| WO | 2004054708 A2 | 7/2004 |

OTHER PUBLICATIONS

Supplemental European Search Report, European Patent Application No. 06789081.4-1213, mailed Jul. 11, 2011.

Xu et al., "Low Temperature Removal of H2S by Nanoporous Composite of Polymer-Mesoporous Molecular Sieve MCM-41 as Adsorbent for Fuel Cell Applications", Energy and Fuels, Sep./Oct. 2005, American Chemical Society US, vol. 19, No. 5, Jun. 8, 2005.

GCC/P/2006/6739, SIPO Novelty Search Report, Form GCC/SIPO/ 610, dated Jun. 24, 2010, 5 pgs.

\* cited by examiner

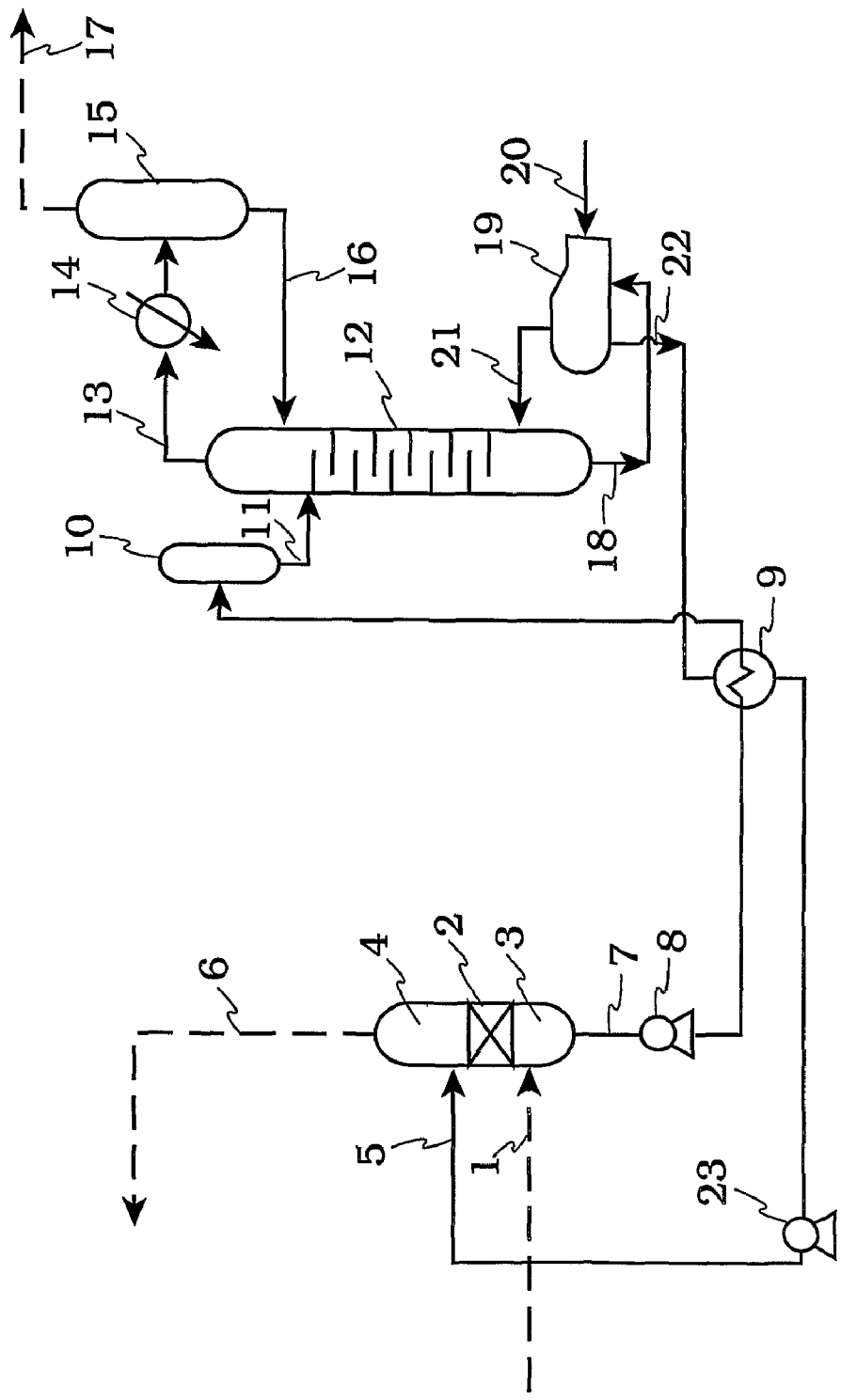

POLYALKYLENEACRYLAMIDE SALT FOR ACID GAS SCRUBBING PROCESS

BACKGROUND OF THE INVENTION

1. Field of the Invention

The present invention relates to an absorbent composition and to a process for the selective absorption of one or more gaseous acidic components, preferably $H_2S$, from a gaseous acidic component(s) containing gas mixture using the absorbent composition.

2. Description of the Related Art

It is well known in the art to treat gases and liquids, such as mixtures containing acidic gases including $CO_2$, $H_2S$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The treatment of acid gas mixtures containing, inter alia, $CO_2$ and $H_2S$ with amine solutions typically results in the simultaneous removal of substantial amounts of both the $CO_2$ and $H_2S$. For example, in one such process generally referred to as the "aqueous amine process", relatively concentrated amine solutions are employed. A recent improvement of this process involves the use of sterically hindered amines as described in U.S. Pat. No. 4,112,052, to obtain nearly complete removal of acid gases such as $CO_2$ and $H_2S$. This type of process may be used where the partial pressures of the $CO_2$ and related gases are low. Another process often used for specialized applications where the partial pressure of $CO_2$ is extremely high and/or where many acid gases are present, e.g., $H_2S$, COS, $CH_3SH$ and $CS_2$ involves the use of an amine in combination with a physical absorbent, generally referred to as the "nonaqueous solvent process". An improvement on this process involves the use of sterically hindered amines and organic solvents as the physical absorbent such as described in U.S. Pat. No. 4,112,051.

It is often desirable, however, to treat acid gas mixtures containing both $CO_2$ and $H_2S$ so as to remove the $H_2S$ selectively from the mixture, thereby minimizing removal of the $CO_2$. Selective removal of $H_2S$ results in a relatively high $H_2S/CO_2$ ratio in the separated acid gas which simplifies the conversion of $H_2S$ to elemental sulfur using the Claus process.

The typical reactions of aqueous secondary and tertiary amines with $CO_2$ and $H_2S$ can be represented as follows:

  (1)

  (2)

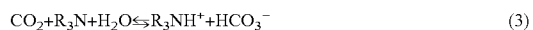  (3)

  (4)

  (5)

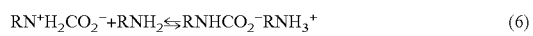  (6)

wherein each R is an organic radical which may be the same or different and may be substituted with an hydroxy group. The above reactions are reversible, and the partial pressures of both $CO_2$ and $H_2S$ are thus important in determining the degree to which the above reactions occur.

While selective $H_2S$ removal is applicable to a number of gas treating operations including treatment of hydrocarbon gases from shale pyrolysis, refinery gas and natural gas having a low $H_2S/CO_2$ ratio, it is particularly desirable in the treatment of gases wherein the partial pressure of $H_2S$ is relatively low compared to that of $CO_2$ because the capacity of an amine to absorb $H_2S$ from the latter type gases is very low. Examples of gases with relatively low partial pressures of $H_2S$ include synthetic gases made by coal gasification, sulfur plant tail gas and low-Joule fuel gases encountered in refineries where heavy residual oil is being thermally converted to lower molecular weight liquids and gases.

Although it is known that solutions of primary and secondary amines such as monoethanolamine (MEA), diethanolamine (DEA), dipropanolamine (DPA), and hydroxyethoxyethylamine (DGA) absorb both $H_2S$ and $CO_2$ gas, they have not proven especially satisfactory for preferential absorption of $H_2S$ to the exclusion of $CO_2$ because the amines undergo a facile reaction with $CO_2$ to form carbamates.

Diisopropanolamine (DIPA) is relatively unique among secondary aminoalcohols in that it has been used industrially, alone or with a physical solvent such as sulfolane, for selective removal of $H_2S$ from gases containing $H_2S$ and $CO_2$, but contact times must be kept relatively short to take advantage of the faster reaction of $H_2S$ with the amine compared to the rate of $CO_2$ reaction shown in Equations 2 and 4 hereinabove.

In 1950, Frazier and Kohl, Ind. and Eng. Chem., 42, 2288 (1950) showed that the tertiary amine, methyldiethanolamine (MDEA), has a high degree of selectivity toward $H_2S$ absorption over $CO_2$. This greater selectivity was attributed to the relatively slow chemical reaction of $CO_2$ with tertiary amines as compared to the rapid chemical reaction of $H_2S$. The commercial usefulness of MDEA, however, is limited because of its restricted capacity for $H_2S$ loading and its limited ability to reduce the $H_2S$ content to the level at low pressures which is necessary for treating, for example, synthetic gases made by coal gasification.

Recently, U.K. Patent Publication No. 2,017,524A to Shell disclosed that aqueous solutions of dialkylmonoalkanolamines, and particularly diethylmonoethanolamine (DEAE), have higher selectivity and capacity for $H_2S$ removal at higher loading levels than MDEA solutions. Nevertheless, even DEAE is not very effective for the low $H_2S$ loading frequency encountered in the industry. Also, DEAE has a boiling point of 161° C., and as such, it is characterized as being a low-boiling, relatively highly volatile amino alcohol. Such high volatilities under most gas scrubbing conditions result in large material losses with consequent losses in economic advantages.

U.S. Pat. Nos. 4,405,581; 4,405,583 and 4,405,585 disclose the use of severely sterically hindered amine compounds for the selective removal of $H_2S$ in the presence of $CO_2$. Compared to aqueous methyldiethanolamine (MDEA) severely sterically hindered amines lead to much higher selectivity at high $H_2S$ loadings.

U.S. Pat. No. 4,487,967 discloses a catalytic synthesis process for selectively preparing severely sterically hindered secondary aminoether alcohols by reacting a primary amino compound with a polyalkenyl ether glycol in the presence of an hydrogenation catalyst at elevated temperatures and pressures.

U.S. Pat. No. 4,665,195 discloses a catalytic synthesis process for producing di-amino-polyalkenyl ethers by reacting (a) one or more acyclic or heterocyclic amino compounds with (b) one or more polyalkenyl ether glycols or polyalkenyl amino ether alcohols, in the presence of an hydrogenation catalyst at elevated temperatures and pressures.

The composition of BTEE has been disclosed in U.S. Pat. No. 4,405,583 and synthesized from tertiarybutylamine and bis-(2-chloroethoxy)-ethane. However, an aqueous BTEE solution suffered from phase separation under regeneration conditions (about 110° C.). EEETB is disclosed as a new composition of matter in U.S. Pat. No. 4,471,138 and can be prepared from tertiary-butylamine and chloroethoxyethoxyethanol. EEETB in aqueous solution can be used for the selective removal of $H_2S$ in the presence of $CO_2$. However, the BTEE/EEETB mixture gives a better selectivity and a higher capacity for $H_2S$ than EEETB. The mixture does not have phase separation under regeneration conditions, i.e., this mixture overcomes the phase separation problem of BTEE. The BTEE/EEETB mixture also gives higher selectivities for $H_2S$ than observed with the severely sterically hindered amines, e.g., ethoxyethanol-tertiary-butylamine (EETB), described in U.S. Pat. Nos. 4,405,581 and 4,405,585.

U.S. Pat. No. 4,417,075 teaches a class of di-secondary amino ethers of the formula

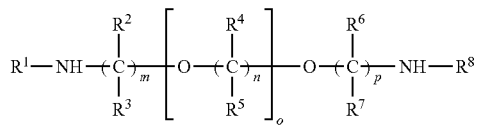

wherein $R^1$ and $R^8$ are each independently selected from the group consisting of primary alkyl having 1-8 carbon atoms, and primary hydroxy alkyl having 2-8 carbon atoms, secondary alkyl and secondary hydroxy alkyl radicals having 3-8 carbon atoms, tertiary alkyl and tertiary hydroxy alkyl radicals having 4 to 8 carbon atoms, $R^2$, $R^3$, $R^4$, $R^5$, $R^6$ and $R^7$ are each independently selected from the group consisting of hydrogen, $C_1$-$C_3$ alkyl and hydroxyalkyl radicals, with that proviso that $R^2$, $R^3$, $R^6$ and $R^7$ are $C_1$-$C_4$ alkyl or hydroxy alkyl radicals when $R^1$ and $R^8$ are primary alkyl or hydroxy alkyl radicals and at least one of $R^2$ or $R^3$ and $R^6$ and $R^7$ are $C_1$ to $C_3$ alkyl or hydroxyalkyl radicals when $R^1$ and $R^8$ are secondary alkyl radicals, m, n and p are positive integers ranging from 2 to 4 and a is either zero or a positive integer ranging from 1 to 10. These compounds are useful in the selective removal of $H_2S$ from gaseous mixtures containing $H_2S$ and $CO_2$.

U.S. Pat. No. 4,894,178 teaches a mixture of two severely hindered amines with the following formula:

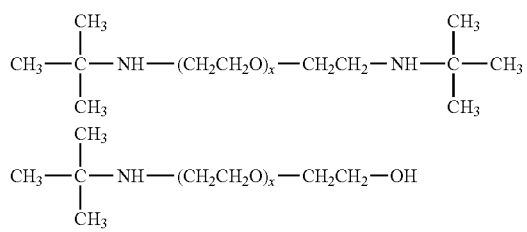

with x being an integer ranging from 2 to 6, and the weight ratio of the first amine to the second amine ranging from 0.43:1 to 2.3:1. This mixture can be prepared in the one-step synthesis, by the catalytic tertiary-butylamination of the polyalkenyl ether glycol, $HO-(CH_2CH_2O)_x-CH_2CH_2-OH$. For example, a mixture of bis(tertiary-butylaminoethoxy) ethane (BTEE) and ethoxyethoxyethanol-tertiary-butylamine (EEETB) can be obtained by the catalytic tertiary-butylaminaton of triethylene glycol.

DESCRIPTION OF THE FIGURE

FIG. 1 is a diagrammatic flow sheet illustrating an absorption regeneration unit for the selective removal of $H_2S$ from gaseous streams containing $H_2S$ and $CO_2$.

SUMMARY OF THE INVENTION

The present invention is directed to unsubstituted or hydrocarbyl substituted polyalkyleneimines and polyalkyleneacrylamide salts and mixtures thereof and their use in processes for the treatment of acid gas mixtures.

DETAILED DESCRIPTION OF THE INVENTION

Unsubstituted or hydrocarbyl substituted polyalkylene acrylamide salts have been identified and have been found to be useful in processes for the treatment of acid gas mixtures.

The unsubstituted or hydrocarbyl substituted polyalkyleneacrylamide salts of the present invention are generally represented by the following formula:

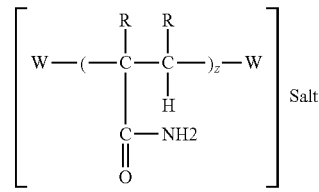

wherein Rs are the same or different and selected from H, $C_1$-$C_9$ alkyl radical, $C_3$-$C_9$ branched chain alkyl, cyclic, cycloalkyl, alkylcyclo radicals, $C_6$-$C_9$ aryl, arylalkyl or alkylaryl radicals, hydroxy substituted derivatives thereof, preferably H or $C_1$-$C_4$ alkyl; and is an integer of at least 1, there being no upper limit because the materials are all water soluble, preferably 1 to 200;
and salt is a basic salt (pH≧8), for
example, from NaOH, KOH, $Zn(OH)_2$, $Mg(OH)_2$, $Ca(OH)_2$, $NR_4OH$ wherein R is as defined above, and W are end groups which do not affect the overall base nature of the absorbent.

The absorbents described above exhibit high selectivity for the removal of one or more gaseous acidic components, such as $H_2S$, from gaseous mixtures of such acidic component(s) and non-acidic gaseous component(s) and $CO_2$, and retain their high selectivity and loading capacity even after regeneration.

The absorbents are utilized for the selective absorption of gaseous acidic components, preferably $H_2S$ from a normally gaseous mixture containing gaseous acidic components, preferably $H_2S$, and $CO_2$ comprising:

(a) contacting said normally gaseous mixture with an absorbent solution characterized as capable of selectively absorbing one or more of the gaseous acidic component, preferably $H_2S$ from said mixture;

(b) regenerating, at least partially, said absorbent solution containing the absorbent gaseous acidic component, e.g., $H_2S$; and (c) recycling the regenerated solution for the selective absorption of gaseous acidic components, preferably $H_2S$ by contacting as in step (a).

Preferably, the regeneration step is carried out by heating and stripping and more preferably heating and stripping with steam.

The term "absorbent solution" as used herein includes but is not limited to solutions wherein the amino compound is dissolved in a solvent selected from water or a physical absorbent or mixtures thereof. Solvents which are physical absorbents (as opposed to the amino compounds which are chemical absorbents) are described, for example, in U.S. Pat. No. 4,112,051, the entire disclosure of which is incorporated herein by reference, and include, e.g., aliphatic acid amides, N-alkylated pyrrolidones, sulfones, sulfoxides, glycols and the mono- and diethers thereof. The preferred physical absorbents herein are sulfones, and most particularly, sulfolane. The preferred liquid medium comprises water.

The absorbent solution ordinarily has a concentration of amino compound of about 0.1 to 6 moles per liter of the total solution, and preferably 1 to 4 moles per liter, depending primarily on the specific amino compound employed and the solvent system utilized. If the solvent system is a mixture of water and a physical absorbent, the typical effective amount of the physical absorbent employed may vary from 0.1 to 5 moles per liter of total solution, and preferably from 0.5 to 3 moles per liter, depending mainly on the type of amino compound being utilized. The dependence of the concentration of amino compound on the particular compound employed is significant because increasing the concentration of amino compound may reduce the basicity of the absorbent solution, thereby adversely affecting its selectivity for $H_2S$ removal, particularly if the amino compound has a specific aqueous solubility limit which will determine maximum concentration levels within the range given above. It is important, therefore, that the proper concentration level appropriate for each particular amino compound be maintained to insure satisfactory results.

The solution of this invention may include a variety of additives typically employed in selective gas removal processes, e.g., antifoaming agents, antioxidants, corrosion inhibitors, and the like. The amount of these additives will typically be in the range that they are effective, i.e., an effective amount.

Also, the amino compounds described herein may be admixed with other amino compounds as a blend. The ratio of the respective amino compounds may vary widely, for example, from 1 to 99 wt % of the amino compounds described herein.

Three characteristics which are of ultimate importance in determining the effectiveness of the amino compounds herein for $H_2S$ removal are "selectivity", "loading" and "capacity". The term "selectivity" as used throughout the specification is defined as the following mole ratio fraction:

$$\frac{\text{(moles of } H_2S/\text{moles of } CO_2) \text{ in liquid phase}}{\text{(moles of } H_2S/\text{moles of } CO_2) \text{ in gaseous phase}}$$

The higher this fraction, the greater the selectivity of the absorbent solution for the $H_2S$ in the gas mixture.

By the term "loading" is meant the concentration of the $H_2S$ and $CO_2$ gases physically dissolved and chemically combined in the absorbent solution as expressed in moles of gas per moles of the amine. The best amino compounds are those which exhibit good selectivity up to a relatively high loading level. The amino compounds used in the practice of the present invention typically have a "selectivity" of not substantially less than 10 at a "loading" of 0.1 moles, preferably, a "selectivity" of not substantially less than 10 at a loading of 0.2 or more moles of $H_2S$ and $CO_2$ per moles of the amino compound.

"Capacity" is defined as the moles of $H_2S$ loaded in the absorbent solution at the end of the absorption step minus the moles of $H_2S$ loaded in the absorbent solution at the end of the desorption step. High capacity enables one to reduce the amount of amine solution to be circulated and use less heat or steam during regeneration.

The acid gas mixture herein necessarily includes $H_2S$, and may optionally include other gases such as $CO_2$, $N_2$, $CH_4$, $H_2$, CO, $H_2O$, COS, HCN, $C_2H_4$, $NH_3$, and the like. Often such gas mixtures are found in combustion gases, refinery gases, town gas, natural gas syn gas, water gas, propane, propylene, heavy hydrocarbon gases, etc. The absorbent solution herein is particularly effective when the gaseous mixture is a gas, obtained, for example, from a shale oil retort, coal liquefaction or gasification, liquefaction of heavy oil with steam, air/steam or oxygen/steam, thermal conversion of heavy residual oil to lower molecular weight liquids and gases, e.g., fluid coker, Flexicoker, delayed coker, or in sulfur plant tail gas cleanup operations.

The absorption step of this invention generally involves contacting the normally gaseous stream with the absorbent solution in any suitable contacting vessel. In such processes, the normally gaseous mixture containing $H_2S$ and $CO_2$ from which the $H_2S$ is to be selectively removed may be brought into intimate contact with the absorbent solution using conventional means, such as a tower or vessel packed with, for example, rings or with sieve plates, or a bubble reactor. Other acidic gaseous components will also be removed preferentially as compared with $CO_2$.

In a typical mode of practicing the invention, the absorption step is conducted by feeding the normally gaseous mixture into the lower portion of the absorption tower while fresh absorbent solution is fed into the upper region of the tower. The gaseous mixture, freed largely from the $H_2S$, emerges from the upper portion of the tower, and the loaded absorbent solution, which contains the selectively absorbed $H_2S$, leaves the tower near or at its bottom. Preferably, the inlet temperature of the absorbent solution during the absorption step is in the range of from about 20° C. to about 100° C., and more preferably from 30° C. to about 60° C. Pressures may vary widely; acceptable pressures are between 5 and 2000 psia, preferably 20 to 1500 psia, and most preferably 25 to 1000 psia in the absorber. The contacting takes place under conditions such that the $H_2S$ is selectively absorbed by the solution. The absorption conditions and apparatus are designed so as to minimize the residence time of the liquid in the absorber to reduce $CO_2$ pickup while at the same time maintaining sufficient residence time of gas mixture with liquid to absorb a maximum amount of the $H_2S$ gas. The amount of liquid required to be circulated to obtain a given degree of $H_2S$ removal will depend on the chemical structure and basicity of the amino compound and on the partial pressure of $H_2S$ in the feed gas. Gas mixtures with low partial pressures such as those encountered in thermal conversion processes will require more liquid under the same absorption conditions than gases with higher partial pressures such as shale oil retort gases.

A typical procedure for the selective $H_2S$ removal phase of the process comprises selectively absorbing $H_2S$ via countercurrent contact of the gaseous mixture containing $H_2S$ and $CO_2$ with the solution of the amino compound in a column containing a plurality of trays at a low temperature, e.g., below 45° C., and at a gas velocity of at least about 0.3 ft/sec (based on "active" or aerated tray surface), depending on the operating pressure of gas, said tray column having fewer than 20 contacting trays, with, e.g., 4-16 trays being typically employed.

After contacting the normally gaseous mixture with the absorbent solution, which becomes saturated or partially saturated with $H_2S$, the solution may be at least partially regenerated so that it may be recycled back to the absorber. As with absorption, the regeneration may take place in a single liquid phase. Regeneration or desorption of the absorbent solution may be accomplished by conventional means such as pressure reduction of the solution or increase of temperature to a point at which the absorbed $H_2S$ flashes off, or bypassing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from about 50° C. to about 170° C., and preferably from about 80° C. to 120° C., and the pressure of the solution on regeneration should range from about 0.5 to about 100 psia, preferably 1 to about 50 psia. The absorbent solution, after being cleansed of at least a portion of the $H_2S$ gas, may be recycled back to the absorbing vessel. Makeup absorbent may be added as needed.

In the preferred regeneration technique, the $H_2S$-rich solution is sent to the regenerator wherein the absorbed components are stripped by the steam which is generated by re-boiling the solution. Pressure in the flash drum and stripper is usually 1 to about 50 psia, preferably 15 to about 30 psia, and the temperature is typically in the range from about 50° C. to 170° C., preferably about 80° C. to 120° C. Stripper and flash temperatures will, of course, depend on stripper pressure, thus at about 15 to 30 psia stripper pressures, the temperature will be about 80° C. to about 120° C. during desorption. Heating of the solution to be regenerated may very suitably be effected by means of indirect heating with low-pressure steam. It is also possible, however, to use direct injection of steam.

In one embodiment for practicing the entire process herein, as illustrated in FIG. 1, the gas mixture to be purified is introduced through line 1 into the lower portion of a gas-liquid countercurrent contacting column 2, said contacting column having a lower section 3 and an upper section 4. The upper and lower sections may be segregated by one or a plurality of packed beds as desired. The absorbent solution as described above is introduced into the upper portion of the column through a pipe 5. The solution flowing to the bottom of the column encounters the gas flowing countercurrently and dissolves the $H_2S$ preferentially. The gas freed from most of the $H_2S$ exits through a pipe 6, for final use. The solution, containing mainly $H_2S$ and some $CO_2$, flow toward the bottom portion of the column, from which it is discharged through pipe 7. The solution is then pumped via optional pump 8 through an optional heat exchanger and cooler 9 disposed in pipe 7, which allows the hot solution from the regenerator 12 to exchange heat with the cooler solution from the absorber column 2 for energy conservation. The solution is entered via pipe 7 to a flash drum 10 equipped with a line (not shown) which vents to line 13 and then introduced by pipe 11 into the upper portion of the regenerator 12, which is equipped with several plates and effects the desorption of the $H_2S$ and $CO_2$ gases carried along in the solution. This acid gas is passed through a pipe 13 into a condenser 14 wherein cooling and condensation of water and amine solution from the gas occur. The gas then enters a separator 15 where further condensation is effected. The condensed solution is returned through pipe 16 to the upper portion of the regenerator 12. The gas remaining from the condensation, which contains $H_2S$ and some $CO_2$, is removed through pipe 17 for final disposal (e.g., to a vent or incinerator or to an apparatus which converts the $H_2S$ to sulfur, such as a Claus unit or a Stretford conversion unit (not shown)).

The solution is liberated from most of the gas which it contains while flowing downward through the regenerator 12 and exits through pipe 18 at the bottom of the regenerator for transfer to a reboiler 19. Reboiler 19, equipped with an external source of heat (e.g., steam injected through pipe 20 and the condensate exits through a second pipe (not shown)), vaporizes a portion of this solution (mainly water) to drive further $H_2S$ therefrom. The $H_2S$ and steam driven off are returned via pipe 21 to the lower section of the regenerator 12 and exited through pipe 13 for entry into the condensation stages of gas treatment. The solution remaining in the reboiler 19 is drawn through pipe 22, cooled in heat exchanger 9, and introduced via, the action of pump 23 (optional if pressure is sufficiently high) through pipe 5 into the absorber column 2.

Typically, a gaseous stream to be treated having a 1:10 mole ratio of $H_2S:CO_2$ from an apparatus for thermal conversion of heavy residual oil, or a Lurgi coal gas having a mole ratio of $H_2S:CO_2$ of less than 1:10 will yield an acid gas having a mole ratio of $H_2S:CO_2$ of about 1:1 after treatment by the process of the present invention. The process herein may be used in conjunction with another $H_2S$ selective removal process; however, it is preferred to carry out the process of this invention by itself, since the amino compounds are extremely effective by themselves in preferential absorption of $H_2S$.

Experimental Procedure

1. Absorption tests were carried out at 35° C. on 0.15 M aqueous solutions of absorbent using a test gas mixture of nitrogen:carbon dioxide:hydrogen sulfide of 89:10:1 for 2 hours.
2. Desorption was run at 85° C. in flowing $N_2$ for 2 hours at the same flow rate as the test gas mixture.

TABLE 1

| Compound | Molecular Weight | Selectivity | Loading (%) | Capacity (%) | Selectivity - Reabsorption |
|---|---|---|---|---|---|
| EETB (U.S. Pat. No. 4,405,585) | 161.24 | 15.4 | 16.3 | 60 | 13.3 |
| Bis-SE (U.S. Pat. No. 4,405,583) | 216.36 | 16.7 | 28.2 | 80 | 25.2 |
| Polyethyleneimine | 42x + 86y | 85.5 | 7.3 | 57 | 102.8 |
| Polyacrylamide | 71.08 z | 4.51 | — | — | — |
| Polyacrylamide-KOH salt | 71.08 z | 77.3 | 10.1 | 71.3 | 112.4 |

The invention claimed is:

1. A process for the selective removal of $H_2S$ from a normally gaseous mixture containing $H_2S$, $CO_2$ and non-acidic components comprising contacting the normally gaseous mixture with an absorbent of a basic unsubstituted or hydrocarbyl substituted polyalkyleneacrylamide salt under conditions whereby the $H_2S$ mixture is selectively absorbed from said mixture.

2. The process of claim 1 wherein the polyalkyleneacrylamide salt absorbent is a basic salt (pH>8) of the formula

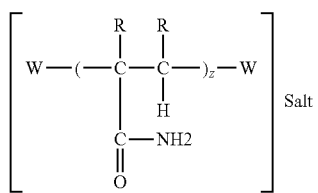

wherein Rs are the same or different and selected from H, $C_1$-$C_9$ alkyl radical, $C_3$-$C_9$ branched chain alkyl, cyclic, cycloalkyl, alkylcyclo radicals, $C_6$-$C_9$ aryl, arylalkyl or alkylaryl radicals, hydroxy substituted derivatives thereof, and z is an integer of at least 1; and W are end groups which do not affect the overall base nature of the absorbent.

3. The process of claim 2 wherein Rs are H or $C_1$-$C_4$ alkyl and salt is derived from NaOH, KOH, $Zn(OH)_2$, $Mg(OH)_2$, $Ca(OH)_2$, or $NR_4OH$.

* * * * *